US006947391B2

(12) United States Patent
Sandy et al.

(10) Patent No.: US 6,947,391 B2
(45) Date of Patent: *Sep. 20, 2005

(54) METHOD OF OPTIMIZING A NETWORK

(75) Inventors: Douglas L. Sandy, Chandler, AZ (US); Nitin B. Sharma, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/661,653

(22) Filed: Sep. 12, 2003

(65) Prior Publication Data

US 2005/0068910 A1 Mar. 31, 2005

(51) Int. Cl.$^7$ .............................................. H04L 12/28
(52) U.S. Cl. ...................................... 370/254; 710/100
(58) Field of Search ................................ 370/386, 235, 370/396, 360, 238, 254, 389, 400, 401, 407; 709/238, 253, 221, 220, 241; 710/301, 100; 340/825.02, 825.06, 825.07

(56) References Cited

U.S. PATENT DOCUMENTS

| | | | | |
|---|---|---|---|---|
| 4,839,885 A | * | 6/1989 | Wu .............................. 398/154 |
| 5,506,711 A | * | 4/1996 | Takeyari ........................ 398/58 |
| 5,557,778 A | * | 9/1996 | Vaillancourt ............ 340/825.02 |
| 2003/0231624 A1 | * | 12/2003 | Alappat et al. .............. 370/360 |

* cited by examiner

Primary Examiner—Ajit Patel
(74) Attorney, Agent, or Firm—Kevin D. Wills

(57) ABSTRACT

An optimized network (300), includes providing a switch card topology (350) having a plurality of switching elements (305), where the plurality of switching elements are arranged to form a switch configuration (303). N number of payload interfaces (307) are coupled to the switch configuration, where each of the N number of payload interfaces is coupled to interface with one of a plurality of payload slots (308). A set of N payload module configurations (402, 502) is characterized by a sequential addition (320) of a payload module (304) into each of the plurality of payload slots, where the sequential addition of the payload module couples the payload module to the network. N number of payload interfaces are coupled to the switch configuration such that a latency function (616) is minimized for the switch configuration and the set of N payload module configurations.

36 Claims, 4 Drawing Sheets

-PRIOR ART-

METHOD OF OPTIMIZING A NETWORK

RELATED APPLICATIONS

Related subject matter is disclosed in U.S. patent application entitled "OPTIMIZED SWITCH CARD" having application Ser. No. 10/662,202 and filed on the same date herewith and assigned to the same assignee.

BACKGROUND OF THE INVENTION

In a bladed network system, switch elements in a prior art switch card are connected such the switch elements interface with external payload slots in a sequential manner. In addition, the most intuitive method of connecting payload modules to a bladed network system is in a sequential manner. This sequential connection will lead to non-optimized performance when deployed in latency sensitive multiprocessing systems.

Accordingly, there is a significant need for an apparatus and method that improves over the deficiencies in the prior art.

BRIEF DESCRIPTION OF THE DRAWINGS

Referring to the drawing.

Figure 1:
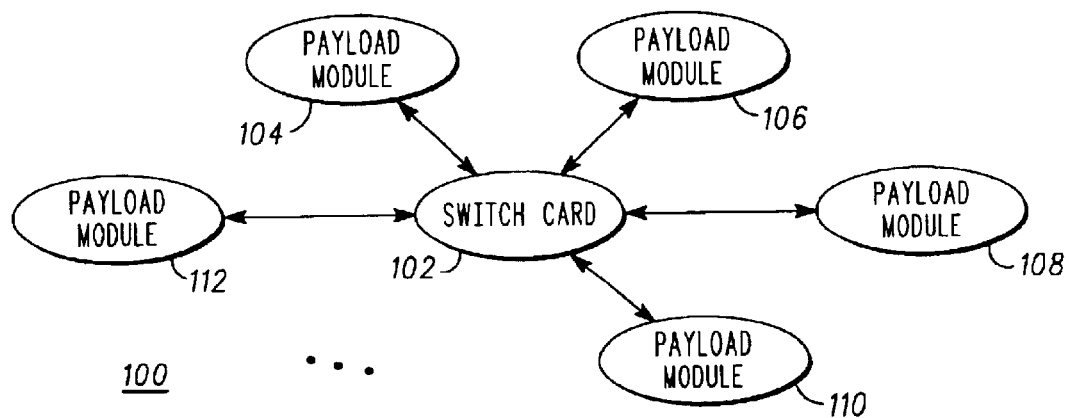
FIG. 1 depicts a block diagram of a network.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a block diagram of a network 100. As shown in FIG. 1, network 100 can have a star topology, which uses point-to-point connections where each payload module 104–112 uses a dedicated link to send/receive data from a central resource such as switch card 102. Data can be in the form of packets 114. As is known in the art, packets 114 generally comprise a header portion that instructs the switching card 102 as to the destination payload module of the packet 114. In the embodiment shown, each packet 114 sent by a payload module 104–112 must pass through switching card 102 so that switching card 102 can route the packet 114 to its destination payload module.

In an embodiment, network 100 can be a bladed architecture, backplane-based network. In the most general sense, a blade in a network is an industry-standard computer delivered on a single card that can be plugged as a module into a chassis. In various embodiments of the invention, a chassis may have anywhere from eight to twenty-four payload slots and therefore accept from eight to twenty-four such payload modules or "blades." As defined, this blade is not able to operate standalone but requires the chassis to provide power, cooling and rigidity.

As an example of an embodiment, a network 100 can include, for example and without limitation, chassis model MVME5100 manufactured by Motorola Computer Group, 2900 South Diablo Way, Tempe, Ariz. 85282. The invention is not limited to this model or manufacturer and any chassis is included within the scope of the invention.

In the embodiment shown, switch card 102 provides the data/packet distribution for the network 100. Each payload module 104–112 can be an individual payload module or a sub-network, and can be a leg on a star of the next layer in the hierarchy. Star topologies generally require redundancy to provide reliability. Reliance on a single switch card 102 can cause a loss of all elements below a failure point. In another embodiment, network 100 can be a "dual star" topology (known in the art), and is often used for high availability applications. However, even in a "dual star" configuration, the network topology still has a "choke" point in the switch card 102 that restricts the speed and efficiency of packet transfer and creates a potential failure point within the network 100.

The physical layer for interfacing network 100 can use, for example and without limitation, 100-ohm differential transmit and receive pairs per channel. Each channel can use high-speed serialization/deserialization (SERDES) and 8 b/10b encoding at speeds up to 3.125 Gigabits per second (Gb/s).

In an embodiment, network 100 can utilize, for example and without limitation, Common Switch Interface Specification (CSIX) for communication between switch card 102 and payload modules 104–112. CSIX defines electrical and packet control protocol layers for traffic management and communication. Packet traffic can be serialized over links suitable for a backplane environment. The CSIX packet protocol encapsulates any higher-level protocols allowing interoperability in an open architecture environment.

Figure 2:
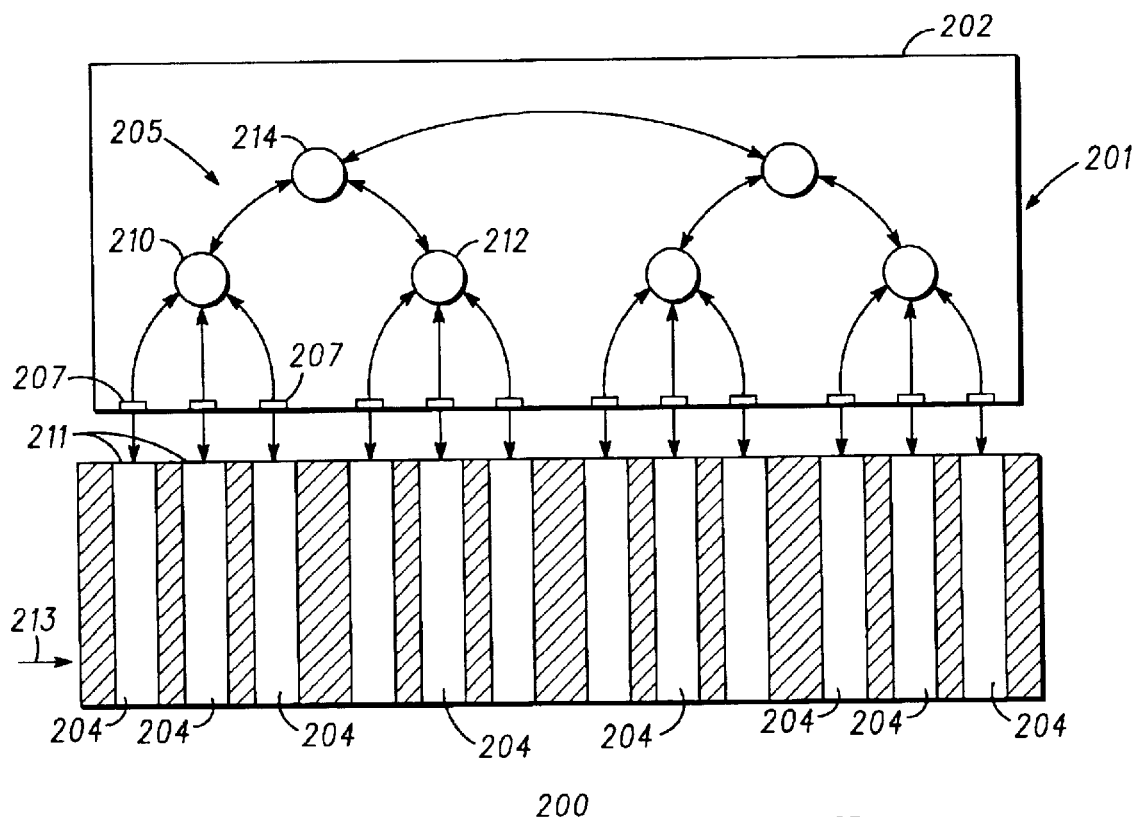
FIG. 2 depicts a block diagram of a prior art network.

FIG. 2 depicts a block diagram of a prior art network 200. As shown in FIG. 2, prior art network 200 can include a prior art switch card 202 and a plurality of payload slots 211 mounted in a chassis 201. Prior art switch card 202 includes a plurality of switching elements 205 arranged into a switch configuration wherein the plurality of switching elements are connected via bi-directional links. A portion of the plurality of switching elements 205 are coupled to a plurality of payload interfaces 207 on prior art switch card 202. Plurality of payload interfaces 207 are each coupled to a payload slot 211 via a backplane of chassis 201 via bi-directional links.

A shown in FIG. 2, plurality of switch elements 205 are connected such that they interface with plurality of payload interfaces 207 in a sequential manner. That is to say, switch element 210 is connected to the first three payload interfaces, which are in turn connected to the first three of the plurality of payload slots 211, and so on.

As prior art network 200 grows and the number of payload modules 204 used in chassis 201 increases, users intuitively place payload modules 204 in plurality of payload slots 211 in a sequential manner 213. This sequential manner 213, can be for example, from left to right. In this manner, the left-most plurality of payload slots 211 are populated first with payload modules 204. So, for example, if prior art network 200 were using only five payload modules 204 placed in sequential manner 213, payload modules 204 would populate the left most plurality of payload slots 211. In this scenario the first three payload modules are connected to switching element 210 and the next two payload modules are connected to switching element 212. Switching elements 210 and 212 are connected via switching element 214 only. This is, there is only one bi-directional path from switching elements 210 and 212 respectively to switching element 214. This can create a situation where there is blocking and hence increased latency in prior art network 200.

To illustrate, assume each payload module 204 has a unique unit of data that must transmitted to each of the other payload modules (an "all-to-all" transfer). A transfer cycle can be defined as the unit of time required to complete a non-blocked transfer from one payload module to another payload module. In a topologically ideal network where each payload module can send and receive data in the same transfer cycle, it would take (N−1) transfer cycles to complete the "all-to-all" data transfer, where N is the number of payload modules in a network.

With bi-directional links and assuming parallel transactions, there will be blocking in prior art network 200 because, during a given transfer cycle, the first three payload modules will be vying to use the one bi-directional link between switching element 210 and switching element 214 in an attempt to transfer data to the other two payload modules. Likewise, blocking will be present because the two payload modules coupled to switching element 212 will be vying to use the one bi-directional link between switching element 212 and switching element 214. Therefore, since some payload modules are forced to be idle during at least one transfer cycle, the number of transfer cycles required to complete the "all-to-all" transfer of data between payload modules will be greater than if blocking were not present.

Figure 3:
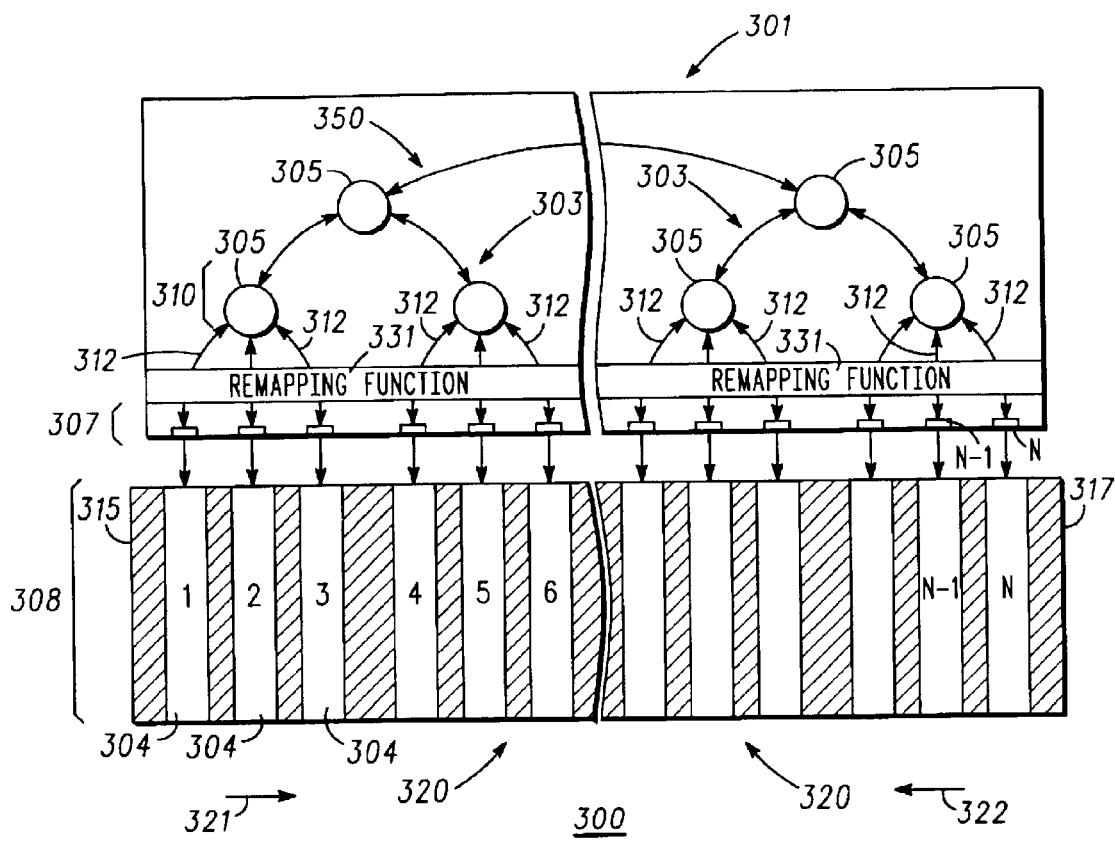
FIG. 3 depicts a block diagram of a network according to an embodiment of the invention.

FIG. 3 depicts a block diagram of a network 300 according to an embodiment of the invention. As shown in FIG. 3, network 300 can include a switch card 302 and a plurality of payload slots 308 mounted in a chassis 301 having a first end 315 and a second end 317. Switch card 302 can include a plurality of switching elements 305 arranged into a switch configuration 303 wherein the plurality of switching elements 305 are connected via bi-directional links. In an embodiment, M number of switching elements 310 can be coupled to N number of payload interfaces 307 via remapping function 331 on switch card 302. N number of payload interfaces 307 are each coupled to one of plurality of payload slots 308 via backplane of chassis 301 using bi-directional links. Each of plurality of payload slots 308 is coupled to receive a payload module 304. Payload module can be a processor module, memory module, server module, and the like.

Each of M number of switching elements 310 can comprise a plurality of ports 312. Each of plurality of ports 312 can be coupled via remapping function 331 to one of N number of payload interfaces 307. Therefore, each of N number of payload interfaces 307 is coupled to one of plurality of payload slots 308. In an embodiment, switch configuration 303, M number of switch elements and plurality of ports 312 on switch card 302 define a switch card topology 350.

As network 300 grows and the number of payload modules 304 used in chassis 301 increases, intuitively there is a sequential addition 320 of payload modules 304 in plurality of payload slots 308. This sequential addition 320 can be for example, first end to second end sequential addition 321. In other words, plurality of payload slots 308 are populated beginning at first end 315 and proceed to second end 317 as network 300 size increases through the addition of more payload modules. In another embodiment, sequential addition 320 can be second end to first end sequential addition 322. In other words, plurality of payload slots 308 are populated beginning at second end 317 and proceed to first end 315 as the network 300 size increases through the addition of more payload modules. In still another embodiment of the invention, sequential addition 320 comprises populating all of the plurality of ports 312 on one of the M number of switching elements 310, one of the M number of switching elements 310 at a time.

In an embodiment, remapping function 331 reorders the coupling of plurality of ports from M number of switching elements 310 to N number of payload interfaces 307 such that sequential addition 320 of payload modules 304 into plurality of payload slots 308 minimizes blocking of network 300. That is to say, remapping function 331 couples N number of payload interfaces 307 so as to minimize latency in network 300.

Figure 4:
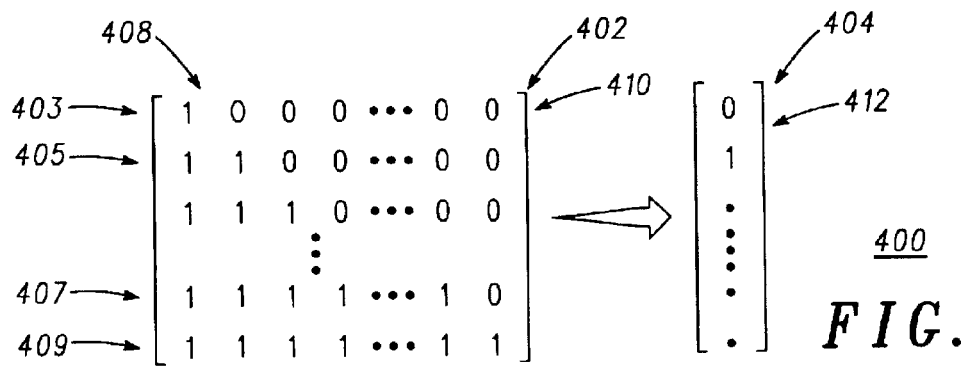
FIG. 4 depicts a vector representation of a set of N payload module configurations and a network behavior vector according to an embodiment of the invention.

FIG. 4 depicts a vector representation 400 of a set of N payload module configurations 402 and a network behavior vector 404 according to an embodiment of the invention. Set of N payload module configurations 402 is characterized by sequential addition 320 of a payload module 304 into each of the plurality of payload slots 308. Sequential addition 320 of payload module 304 couples payload module 304 to network 300.

Each column in set of N payload module configurations 402 represents a payload slot position 408. Each row in set of N payload module configurations 402 represents a payload module configuration 410. Each number in the set of payload module configurations 402 represents the status of the particular payload slot position for a given payload module configuration 410. For example, the first column represents the status of payload slot 1, the second column represents the status of payload slot 2, etc. for each set of N payload module configurations. The last column represents the status of payload slot N. A "1" in set of N payload module configurations 402 represents a payload slot populated by a payload module. A "0" in set of N payload module configurations 402 represents a payload slot that is not populated with a payload module.

As stated above, each row in set of N payload module configurations 402 represents a payload module configuration 410. In an embodiment, row 403 represents the payload module configuration indicating the presence of one payload module 304 in the payload slot closest to first end 315. Row 405 represents the payload module configuration indicating the presence of a payload module 304 in each of the two payload slots closest to first end 315, and so on. Row 407 represents the payload module configuration indicating the presence of a payload module 304 in N−1 payload slots, while row 409 indicates a fully-populated plurality of payload slots 308. Starting at row 403 and reading down to row 409 indicates sequential addition 320 of payload modules 304 into each of the plurality of payload slots 308. The embodiment of FIG. 4 represents first end to second end sequential addition 322.

Each element in network behavior vector 404 indicates an all-to-all transfer time 412 in number of transfer cycles for the corresponding payload module configuration in set of N payload module configurations 402. As the number of payload modules coupled to network 300 increases, so does the all-to-all transfer time 412.

Figure 5:
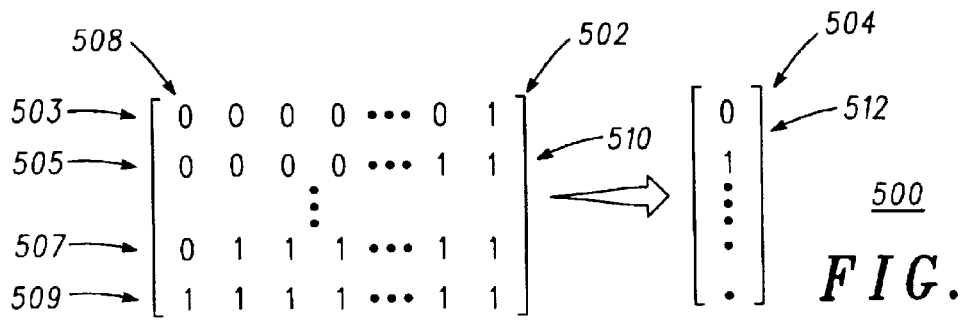
FIG. 5 depicts a vector representation of a set of N payload module configurations and a network behavior vector according to another embodiment of the invention.

FIG. 5 depicts a vector representation 500 of a set of N payload module configurations 502 and a network behavior vector 504 according to an embodiment of the invention. Set of N payload module configurations 502 is characterized by sequential addition 320 of a payload module 304 into each of the plurality of payload slots 308. Sequential addition 320 of payload module 304 couples payload module 304 to network 300.

Each column in set of N payload module configurations 502 represents a payload slot position 508. Each row in set of N payload module configurations 502 represents a payload module configuration 510. Each number in the set of payload module configurations 502 represents the status of the particular payload slot position for a given payload module configuration 510. For example, the first column represents the status of payload slot 1, the second column represents the status of payload slot 2, etc. for each set of N payload module configurations. The last column represents the status of payload slot N. A "1" in set of N payload module configurations 502 represents a payload slot populated by a payload module. A "0" in set of N payload module configurations 502 represents a payload slot that is not populated with a payload module.

As stated above, each row in set of N payload module configurations 502 represents a payload module configuration 510. In an embodiment, row 503 represents the payload module configuration indicating the presence of one payload module 304 in the payload slot closest to second end 317. Row 505 represents the payload module configuration indicating the presence of a payload module 304 in each of the two payload slots closest to second end 317, and so on. Row 507 represents the payload module configuration indicating the presence of a payload module 304 in N−1 payload slots, while row 509 indicates a fully-populated plurality of payload slots 308. Starting at row 503 and reading down to row 509 indicates sequential addition 320 of payload modules 304 into each of the plurality of payload slots 308. The embodiment of FIG. 5 represents second end to first end sequential addition 322.

Each element in network behavior vector 504 indicates an all-to-all transfer time 512 in number of transfer cycles for the corresponding payload module configuration in set of N payload module configurations 502. As the number of payload modules coupled to network 300 increases, so does the all-to-all transfer time 512.

As can be seen by one skilled in the art, a set of N payload module configurations can be generated for any sequential addition of payload modules. For example, a set of N payload module configurations can be generated for the sequential addition 320 illustrating the population of all of the plurality of ports 312 on one of the M number of switching elements 310, one of the M number of switching elements 310 at a time. A corresponding network behavior vector can also be generated.

Figure 6:
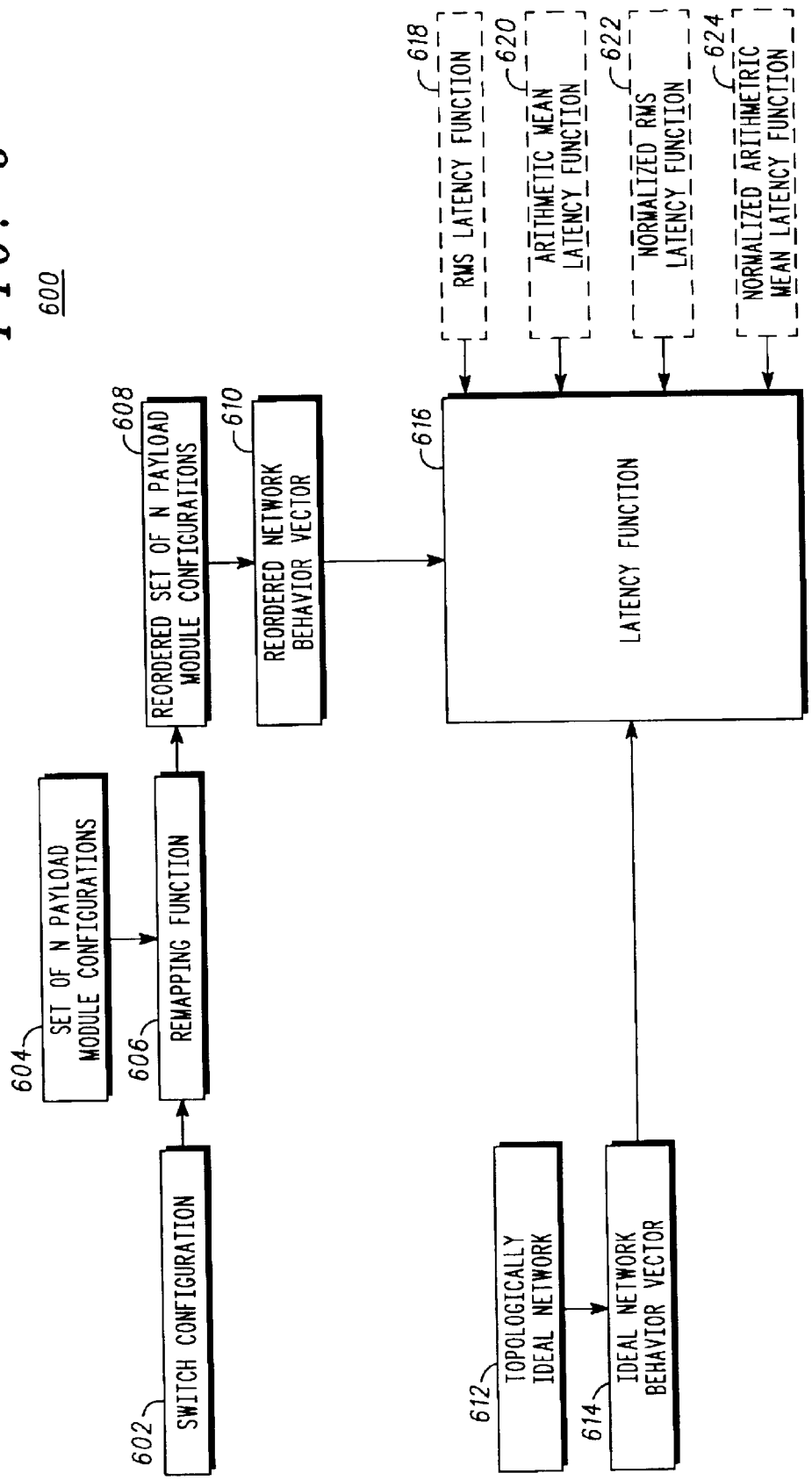
FIG. 6 depicts a block diagram of a method of the invention.

FIG. 6 depicts a block diagram 600 of a method of the invention. As shown in FIG. 6, switch configuration 602 and set of N payload module configurations 604 are inputs to remapping function 606. Switch configuration 602 can be any configuration of plurality of switching elements 305 on switch card 302. In an embodiment, plurality of switching elements 305 in switch configuration 303 can comprise of any number of plurality of switching elements 305 arranged in any hierarchical or non-hierarchical manner. Set of N payload module configurations 604 can be characterized by sequential addition 320 of a payload module 304 into each of the plurality of payload slots 308.

Remapping function 606 can reorder the coupling of plurality of ports from M number of switching elements 310 to N number of payload interfaces 307. In vector notation, remapping function 606 remaps the vector representation of set of N payload module configurations 604 to reordered set of N payload module configurations 608. Reordered set of N payload module configurations 608 can comprise N payload module configurations where the addition of payload modules to the network is non-sequential. This can be represented in vector notation analogous to set of N payload module configurations shown in FIGS. 4 and 5. For a network with N number of payload modules, there are N! unique remapping functions, which each can generate a unique reordered set of N payload module configurations 608.

With each reordered set of N payload module configurations 608, there exists a reordered network behavior vector 610. In an embodiment, reordered network behavior vector 610 indicates an all-to-all transfer time in number of transfer cycles for the corresponding payload module configuration in reordered set of N payload module configurations 608. As the number of payload modules coupled to network 300 increases, so does the all-to-all transfer time. Reordered network behavior vector 610 can comprise all-to-all transfer times that are different than those found in network behavior vector 404, 504.

Topologically ideal network 612 is a network where no blocking can occur during all-to-all transfers. Topologically ideal network 612 represents the best-case network for a given number of payload modules. In an embodiment, ideal network behavior vector 614 is generated from topologically ideal network 612 and indicates an all-to-all transfer time in number of cycles for a given payload configuration. In topologically ideal network 612, each payload module can send and receive a unique unit of data in the same transfer cycle. Therefore, it requires (N−1) transfer cycles to complete the "all-to-all" data transfer, where N is the number of payload modules in a network. That is to say, for each payload module configuration, the all-to-all transfer time in number of transfer cycles in ideal network behavior vector 614 is (N−1).

For each element in reordered network behavior vector 610, there exists a corresponding element in ideal network behavior vector 614. As shown above, each element in ideal network behavior vector is (N−1). Latency function 616 is a vector scalar function that computes the deviation of the all-to-all transfer time behavior of network 300 from that of topologically ideal network 612. This is done by comparing the deviation of each element of reordered network behavior vector 610 from its corresponding element in ideal network behavior vector 614. This calculation is simplified somewhat since each element in ideal network behavior vector 614 is (N−1).

In an embodiment, for each of the plurality of remapping functions 606, a reordered network behavior vector 610 can be generated. By minimizing latency function 616, a reordered set of N payload module configurations 608 that minimizes latency in network 300 can be found. By selecting the one of a plurality of remapping functions that minimizes latency function 616, N number of payload interfaces 307 can be coupled to switch configuration 303 such that latency in network 300 is minimized for a sequential addition 320 of payload modules to network 300. In another embodiment, by selecting the one of a plurality of remapping functions that minimizes latency function 616, the sequence of adding payload modules to network can be reordered to minimize latency in network 300.

In an embodiment, minimizing latency function 616 can be found by using root-mean squared (rms) latency function 618 as follows:

$$L_{rms}(u,v) = (1/N)*((u_1-v_1)^2 + (u_2-v_2)^2 + \ldots + (u_N-v_N)^2)^{1/2}$$

where:
$L_{rms}(u,v)$ = rms latency function.
N = number of payload modules in network.
u = element in reordered network behavior vector (represents all-to-all transfer time in for a payload module configuration in a reordered set of N payload module configurations).
v = element in ideal network behavior vector corresponding to element in reordered network behavior vector for a reordered set of N payload module configurations. In an embodiment, all values of $v_N=(N-1)$.

In another embodiment, minimizing latency function 616 can be found by using arithmetic mean latency function 620 as follows:

$$L_{mean}(u,v) = (1/N)*((u_1-v_1)+(u_2-v_2) \ldots +(u_N-v_N))$$

where:
$L_{mean}(u,v)$ = arithmetic mean latency function.
N = number of payload modules in network.
u = element in reordered network behavior vector (represents all-to-all transfer time in for a payload module configuration in a reordered set of N payload module configurations).
v = element in ideal network behavior vector corresponding to element in reordered network behavior vector for a reordered set of N payload module configurations. In an embodiment, all values of $v_N=(N-1)$.

In yet another embodiment, minimizing latency function 616 can be found by using normalized root-mean squared (rms) latency function 622 as follows:

$$L_{nrms}(u,v) = (1/N)*((1/1)*(u_2-v_2)^2 + (1/2)*(u_3-v_3)^2 + \ldots + (1/(N-1))*(u_N-v_N))^2)^{1/2}$$

where:
$L_{nrms}(u,v)$ = normalized rms latency function.
N = number of payload modules in network.
u = element in reordered network behavior vector (represents all-to-all transfer time in for a payload module configuration in a reordered set of N payload module configurations).
v = element in ideal network behavior vector corresponding to element in reordered network behavior vector for a reordered set of N payload module configurations. In an embodiment, all values of $v_N=(N-1)$.

In still another embodiment, minimizing latency function 616 can be found by using normalized arithmetic mean latency function 624 as follows:

$$L_{nmean}(u,v) = (1/N)*((1/1)*(u_2-v_2)+(1/2)*(u_3-v_3) \ldots +(1/(N-1))*(u_N-v_N))$$

where:
$L_{nmean}(u,v)$ = normalized arithmetic mean latency function.
N = number of payload modules in network.
u = element in reordered network behavior vector (represents all-to-all transfer time in for a payload module configuration in a reordered set of N payload module configurations).
v = element in ideal network behavior vector corresponding to element in reordered network behavior vector for a reordered set of N payload module configurations. In an embodiment, all values of $v_N=(N-1)$.

For each reordered network behavior vector 610 generated by plurality of remapping functions 606, there will exist a latency function that represents a minimum deviation of the all-to-all transfer time behavior of network 300 from that of topologically ideal network 612. In an embodiment, by using the reordered set of N payload module configurations 608 corresponding to the minimized latency function, the sequence of adding payload modules to network 300 can be reordered to minimize latency. In another embodiment, by using the remapping function 606 corresponding to the minimized latency function as remapping function 331, N number of payload interfaces 307 can be coupled to switch configuration 303 on switch card such that latency in network 300 is minimized for a sequential addition 320 of payload modules to network 300. In an embodiment, there might be more than one latency function that minimizes latency in network 300.

Figure 7:
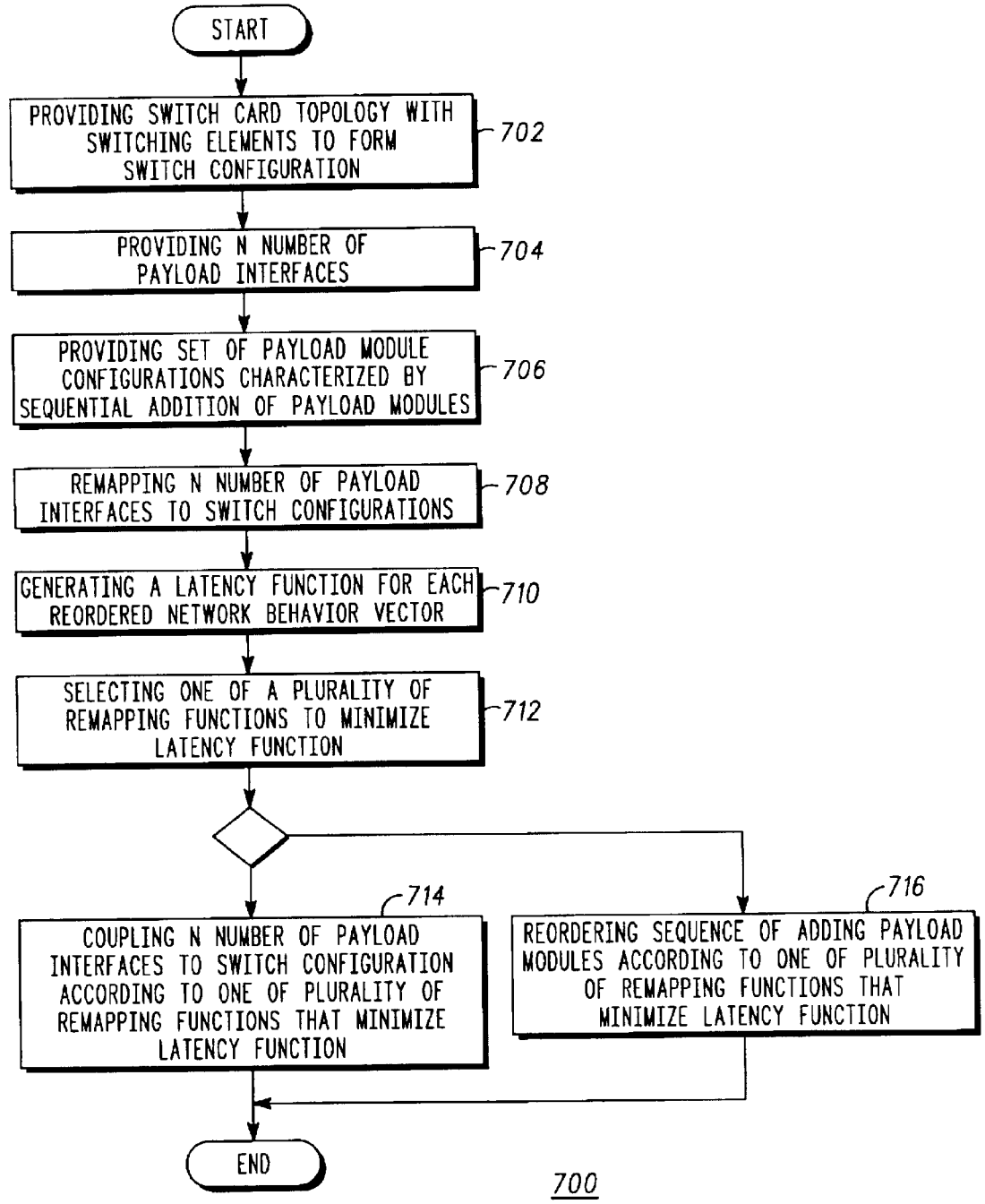
FIG. 7 illustrates a flow diagram in accordance with a method of the invention.

FIG. 7 illustrates a flow diagram 700 in accordance with a method of the invention. In step 702, in a network, a switch card topology is provided having a plurality of switching elements, where the plurality of switch elements form a switch configuration. In step 704, N number of payload interfaces are provided, where each of the N number of payload interfaces is coupled to interface with one of a plurality of payload slots.

In step 706, a set of N payload module configurations is provided. The set of N payload module configurations is characterized by a sequential addition of a payload module into each of the plurality of payload slots, where the sequential addition of the payload module couples the payload module to the network.

Step 708 includes remapping the N number of payload interfaces to the switch configuration. Remapping includes calculating a plurality of remapping functions for the set of N payload module configurations. Each of plurality of remapping functions generates a reordered set of N payload module configurations and a reordered network behavior vector. Step 710 includes generating a latency function for each reordered network behavior vector.

Step 712 includes selecting one of the plurality of remapping functions to minimize latency function, where latency function is a function of the switch configuration and the set of N payload module configurations. Subsequent to step 712, either step 714 or step 716 can be performed.

Step 714 includes coupling N number of payload interfaces to switch configuration such that latency function is minimized for switch configuration and set of N payload module configurations. Step 716 includes reordering a sequence of adding a payload module into each of the payload slots such that latency function is minimized, wherein latency function is a function of the switch configuration and the set of N payload module configurations.

While we have shown and described specific embodiments of the present invention, further modifications and improvements will occur to those skilled in the art. It is therefore to be understood that appended claims are intended to cover all such modifications and changes as fall within the true spirit and scope of the invention.

What is claim is:

1. A method of optimizing a network, comprising:
providing a switch card topology having a plurality of switching elements, wherein the plurality of switching elements are arranged to form a switch configuration;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network; and
coupling the N number of payload interfaces to the switch configuration such that a latency function is minimized for the switch configuration and the set of N payload module configurations.

2. The method of claim 1, wherein the latency function is a root-mean squared latency function.

3. The method of claim 1, wherein the latency function is an arithmetic mean latency function.

4. The method of claim 1, wherein the latency function is a normalized root-mean squared latency function.

5. The method of claim 1, wherein the latency function is a normalized arithmetic mean latency function.

6. The method of claim 1, wherein the sequential addition comprises a first end to a second end sequential addition.

7. The method of claim 1, wherein the sequential addition comprises a second end to a first end sequential addition.

8. The method of claim 1, wherein the plurality of switching elements comprises M number of switching elements coupled to the N number of payload interfaces, wherein each of the M number of switching elements has a plurality of ports, and wherein the sequential addition comprises populating all of the plurality of ports on one of the M number of switching elements, one of the M number of switching elements at a time.

9. A method of optimizing a network, comprising:
providing a switch card having a plurality of switching elements, wherein the plurality of switching elements are arranged to form a switch configuration;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network; and
remapping the N number of payload interfaces to the switch configuration such that a latency function is minimized, wherein the latency function is a function of the switch configuration and the set of N payload module configurations.

10. The method of claim 9, wherein the latency function is a root-mean squared latency function.

11. The method of claim 9, wherein the latency function is an arithmetic mean latency function.

12. The method of claim 9, wherein the latency function is a normalized root-mean squared latency function.

13. The method of claim 9, wherein the latency function is a normalized arithmetic mean latency function.

14. The method of claim 9, wherein the sequential addition comprises a first end to a second end sequential addition.

15. The method of claim 9, wherein the sequential addition comprises a second end to a first end sequential addition.

16. The method of claim 9, wherein the plurality of switching elements comprises M number of switching elements coupled to the N number of payload interfaces, wherein each of the M number of switching elements has a plurality of ports, and wherein the sequential addition comprises populating all of the plurality of ports on one of the M number of switching elements, one of the M number of switching elements at a time.

17. A method of optimizing a network, comprising:
providing a switch card topology having a plurality of switching elements, wherein the plurality of switching elements are arranged to form a switch configuration;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network;
calculating a plurality of remapping functions for the set of N payload module configurations; and
selecting one of the plurality of remapping functions to minimize a latency function, wherein the latency function is a function of the switch configuration and the set of N payload module configurations.

18. The method of claim 17, coupling the N number of payload interfaces to the switch configuration according to the one of the plurality of remapping functions selected to minimize the latency function.

19. The method of claim 17, wherein the latency function is a root-mean squared latency function.

20. The method of claim 17, wherein the latency function is an arithmetic mean latency function.

21. The method of claim 17, wherein the latency function is a normalized root-mean squared latency function.

22. The method of claim 17, wherein the latency function is a normalized arithmetic mean latency function.

23. The method of claim 17, wherein the sequential addition comprises a first end to a second end sequential addition.

24. The method of claim 17, wherein the sequential addition comprises a second end to a first end sequential addition.

25. The method of claim 17, wherein the plurality of switching elements comprises M number of switching elements coupled to the N number of payload interfaces, wherein each of the M number of switching elements has a plurality of ports, and wherein the sequential addition comprises populating all of the plurality of ports on one of the M number of switching elements, one of the M number of switching elements at a time.

26. A method of optimizing a network, comprising:
providing a switch card having a plurality of switching elements, wherein the plurality of switching elements are arranged to form a switch configuration;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network;
calculating a plurality of remapping functions for the set of N payload module configurations; and
minimizing an all-to-all transfer time in the network by selecting one of the plurality of remapping functions to minimize a latency function, wherein the latency function is a function of the switch configuration and the set of N payload module configurations.

27. The method of claim 26, coupling the N number of payload interfaces to the switch configuration according to the one of the plurality of remapping functions selected to minimize the latency function.

28. A method of optimizing a switch card, comprising:
providing a plurality of switching elements, wherein the plurality of switching elements are arranged to form a switch configuration on the switch card;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network; and
coupling the N number of payload interfaces to the switch configuration such that a latency function is minimized for the switch configuration and the set of N payload module configurations.

29. The method of claim 28, wherein the latency function is a root-mean squared latency function.

30. The method of claim 28, wherein the latency function is an arithmetic mean latency function.

31. The method of claim 28, wherein the latency function is a normalized root-mean squared latency function.

32. The method of claim 28, wherein the latency function is a normalized arithmetic mean latency function.

33. The method of claim 28, wherein the sequential addition comprises a first end to a second end sequential addition.

34. The method of claim 28, wherein the sequential addition comprises a second end to a first end sequential addition.

35. The method of claim 28, wherein the plurality of switching elements comprises M number of switching elements coupled to the N number of payload interfaces, wherein each of the M number of switching elements has a plurality of ports, and wherein the sequential addition comprises populating all of the plurality of ports on one of the M number of switching elements, one of the M number of switching elements at a time.

36. A method of optimizing a network, comprising:
providing a switch card having a plurality of switching elements, wherein the plurality of switching elements are arranged to form a switch configuration;
providing N number of payload interfaces coupled to the switch configuration, wherein each of the N number of payload interfaces is coupled to interface with one of a plurality of payload slots;
providing a set of N payload module configurations, wherein the set of N payload module configurations is characterized by a sequential addition of a payload module into each of the plurality of payload slots, wherein the sequential addition of the payload module couples the payload module to the network; and
reordering a sequence of adding the payload module into each of the payload slots such that a latency function is minimized, wherein the latency function is a function of the switch configuration and the set of N payload module configurations.

* * * * *